United States Patent [19]
Tanaka et al.

[11] Patent Number: 5,420,573
[45] Date of Patent: May 30, 1995

[54] AUDIO-VISUAL SYSTEM WITH TWO-WAY COMMUNICATION BETWEEN DEVICES

[75] Inventors: Shigeo Tanaka; Masaru Sato, both of Tokyo, Japan

[73] Assignee: Sony Corporation, Tokyo, Japan

[21] Appl. No.: 299,318

[22] Filed: Aug. 31, 1994

Related U.S. Application Data

[63] Continuation of Ser. No. 928,447, Aug. 12, 1992, abandoned.

[30] Foreign Application Priority Data

Aug. 28, 1991 [JP] Japan .................................. 3-215742

[51] Int. Cl.⁶ ...................... G05B 19/02; G08C 19/12; H04L 17/02
[52] U.S. Cl. .............................. 340/825.24; 341/176; 348/734; 455/151.4
[58] Field of Search ...................... 340/825.24, 825.71, 340/825.72, 825.73; 341/23, 176; 359/146, 148; 455/151.4, 353; 348/734

[56] References Cited

U.S. PATENT DOCUMENTS

| | | | |
|---|---|---|---|
| 4,771,283 | 9/1988 | Imoto | 340/825.71 |
| 4,825,200 | 6/1989 | Evans et al. | 341/23 |
| 5,081,534 | 1/1992 | Geiger et al. | 358/194.1 |
| 5,109,284 | 4/1992 | Jung | 358/194.1 |
| 5,136,285 | 8/1992 | Okuyama | 340/825.72 |
| 5,235,328 | 8/1993 | Kurita | 359/146 |

FOREIGN PATENT DOCUMENTS 2266795 10/1990 Japan .

OTHER PUBLICATIONS

Transportation Electronics: Proceedings of the International Congress on Transportation Electronics. Society of Automotive Engineers. Oct. 1986. "Digital LSI: The Key to refining the Automotive Audio System". (Kawata et al.) pp. 99-106.

*Primary Examiner*—Donald J. Yusko
*Assistant Examiner*—David Jung
*Attorney, Agent, or Firm*—Jay H. Maioli

[57] ABSTRACT

An audiovisual system allows a plurality of audiovisual devices to be interconnected for convenient operation from a single set of function keys. The system includes a first AV device and other connected AV devices connected so as to bidirectionally transfer data. Control data from connected devices are read by a CPU of the first device and written to a RAM memory portion of the first device. When a function key of the first device is operated, a connected device is operated according to the control data read therefrom and stored in the first device. A memory card incorporating control data for the external devices may further be accessed by the first AV device for reading control data for the external devices. A particular function key may control as many functions as there are connected devices in the AV system.

5 Claims, 3 Drawing Sheets

AUDIO-VISUAL SYSTEM WITH TWO-WAY COMMUNICATION BETWEEN DEVICES

This is a continuation of application Ser. No. 07/928,447 filed Aug. 12, 1992, now abandoned.

BACKGROUND OF THE INVENTION

1. Field of the Invention

The present invention relates generally to an audio/visual (AV) system and particularly to an AV system which systematically allows interconnected AV devices to function from a single set of control, or function keys.

2. Description of the Prior Art

Conventionally, AV devices are equipped with function keys for accessing various functions of the device. However, when shipped, the operations performed by function keys on such AV devices are predetermined and cannot be varied after shipment. Therefore, when two or more AV devices are connected together, respective operations must be accomplished via the function keys of each device, separately. Thus, operation becomes complicated and inconvenient.

In order to operate one AV device from the function keys of another device, preparation of function keys combinable with all of the AV devices to be operated is required. This may require a large number of function keys, further complicating operation. Further, preparation of function keys which may be required for operation of future AV devices is difficult to accomplish.

SUMMARY OF THE INVENTION

It is therefore a principal object of the present invention to provide an AV system in which an AV device with a minimum of function keys, the functions thereof being variable, may accomplish simplified operation of interconnected AV components.

In order to accomplish the aforementioned and other objects, an audio-visual device is provided wherein a plurality of function keys are provided, each function key being operable in accordance with control data corresponding thereto, and further comprising: connection means for connection to a second audio-visual device; transmitting/receiving means for transmitting and/or receiving data from a connected second audio-visual device; first reading means for reading control data from the second audio-visual device; memory means for storing the control data from the second audio-visual device; and means for reading the stored control data and transmitting same to the second audio-visual device via the transmitting/receiving means according to operation of one of the function keys of the audio-visual device.

According to another aspect of the present invention, an audio-visual device is provided wherein a plurality of function keys are provided, each function key being operable in accordance with control data corresponding thereto, and further comprising: connection means for connection to a second audio-visual device; reading means for reading a memory card; a memory card containing control data for the second audio-visual device, the memory card being connected with the reading means; memory means for storing the control data from the memory card; and means for reading the control data stored in the memory means and transmitting same to the second audio-visual device via the connection means according to operation of one of the function keys of the audio-visual device.

DESCRIPTION OF THE PREFERRED EMBODIMENT

Figure 1:
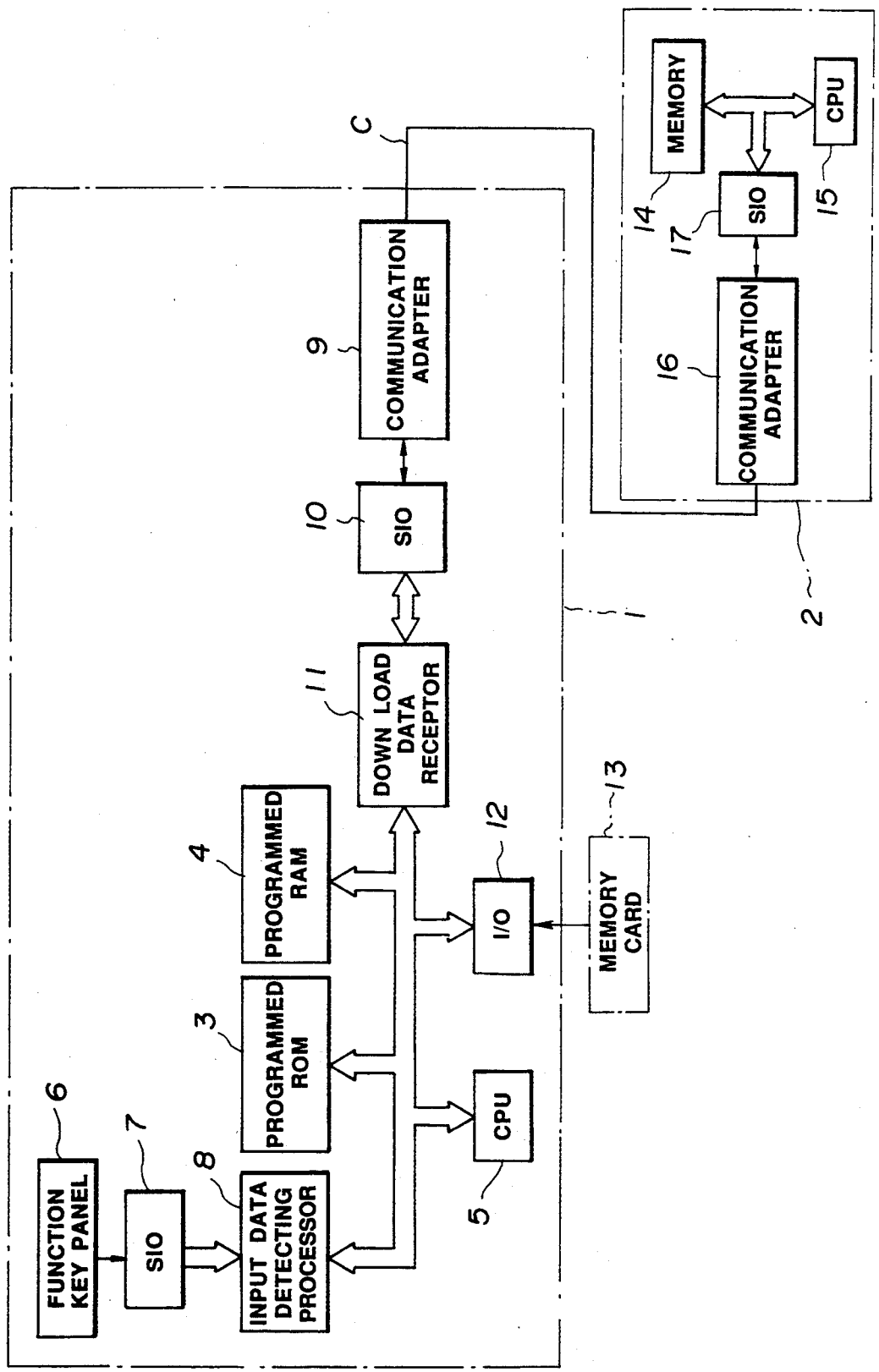
FIG. 1 is a block diagram showing a circuit of an AV system according to one embodiment of the invention.
Figure 2:
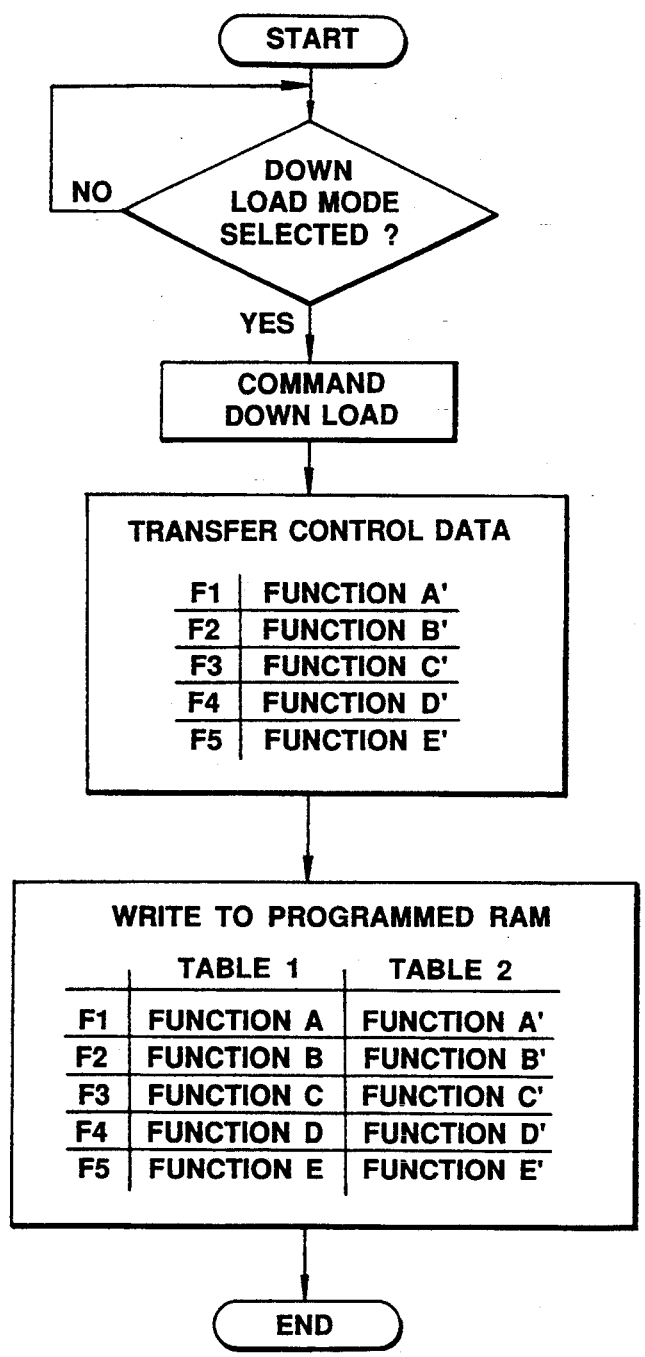
FIG. 2 is a flowchart detailing a downloading operation of the AV device of the invention.
Figure 3:
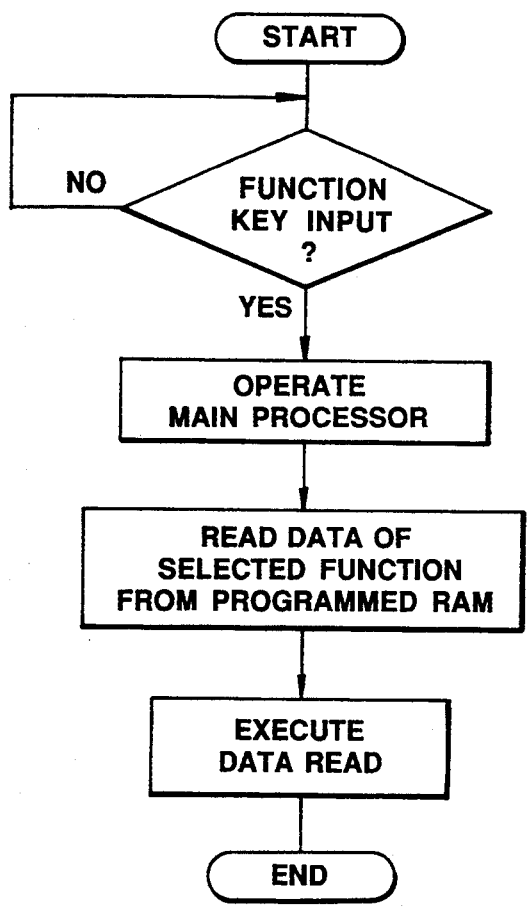
FIG. 3 is a flowchart detailing execution of a function by the AV device of the invention.

Referring now to the drawings, particularly to FIGS. 1-3, a preferred embodiment of the present invention will be described hereinbelow.

FIG. 1 is a block diagram showing a circuit of an AV system according to the invention. As seen in the drawing, the AV system comprises a first AV device 1, a television for example, and a second AV device 2, a CD-ROM unit for example. The first and second AV devices 1, 2 are connected via a cable C.

The first AV device 1 includes a programmed read only memory (ROM) 3 and a programmable random access memory (RAM) 4. The reading and writing of the memories 3, 4, is controlled by a central processing unit (CPU) 5. Main processing data is stored in the ROM memory 3, and control data (functions A-E) corresponding to each function (F1-F5) of the first AV device 1 are stored in the programmable RAM memory 4.

A plurality of function keys (not shown) are installed in a function key panel 6 to select various functions according to a desired operation of the AV device 1. Data output from the function key panel 6 is input to the CPU 5 via a serial input/output circuit (SIO) 7 and an input data detecting processor 8.

A communication adapter 9 is installed in the first AV device 1 to bidirectionally transfer data between the first AV device 1 and the second AV device 2. External signals (i.e. from the second AV device 2) are input from the communication adapter 9 and fed to the CPU 5 via a second SIO 10 and a download data receptor 11. On the other hand, command signals from the first AV device 1 are output from the CPU 5 via the communication adapter 9.

In addition, according to a second embodiment of the invention, the first AV device 1 may be further equipped with a memory card reader (not shown) to input data stored in a memory card 13 to the CPU 5 via an input/output (I/O) port 12. Control data for any of the AV devices 1, 2, or for additional devices to be connected may be written into the memory card 13. The memory card may be a RAM card, magnetic card, photo card, photomagnetic cards, etc., or alternatively any other information storage medium (i.e. a disk drive etc.) may be employed.

As for the second AV device 2, a memory 14 is provided as well as a CPU 15 to control reading and writing done by the memory 14. Main processing data and control data (functions A'-E') corresponding to each function (F1-F5) of the second AV device are stored in the memory 14. A communication adapter 16, similar to that of the first AV device 1 is provided in the second AV device 2. External signals input to the communication adapter are fed to the CPU 15 via a SIO 17. On the other hand, output signals from the second AV device 2 are output by the communication adapter 16.

Referring now to FIG. 2, the functioning of the AV system of the invention will be explained hereinbelow.

First, a downloading operation is selected at the function key panel 6 (FIG. 1) when the AV system is formed by connection of the first AV device 1 and the second AV device 2 via the cable C. According to selection of downloading operation, the CPU 5 outputs a download command signal which is routed to the CPU 15 of the second AV device through the cable C.

Control data functions (A'–E') stored in the memory 14 are read by the CPU 15 of the second AV device and transferred to the first AV device 1 via the cable C and the communication adapters 9 and 16. The transferred data is written to the programmable RAM 4 of the first AV device by the CPU 5 thereof. That is, as shown in FIG. 2, control data (functions A–E) of the first AV device 1 are stored in a Table 1 of the programmable RAM 4, and other control data (i.e. functions A'–E' of the second AV device 2) are stored in Table 2 of the programmable RAM 4 of the first AV device 1.

Referring now to FIG. 3, when a TV (television) mode, for example, is selected at the function key panel 6 (FIG. 1), function 1 (F1) is concurrently selected therewith. Then, the CPU 5 reads the main processor of the programmed ROM 3, and the main processor outputs a control signal to execute function A according to the control data stored in Table 1 of the programmable RAM 4 (i.e. function A). Thus, function A is executed by the first AV device.

Alternatively, when a mode or function of the second AV device 2 is selected at the function key panel 6, the function 1 (F1), for example, is concurrently selected. The CPU 5 reads the main processor of the programmed ROM 3 and the main processor outputs a control signal to execute function A' according to the control data in Table 2 of the programmable RAM 4 to the second AV device 2 via the cable C and the communication adapters 9 and 16. Thus the second AV device 2 executes function A' according to the control signal from the first AV device 1.

Accordingly, the functions executed by the function keys of the function key panel 6 are varied according to which of the AV devices is to be operated. Therefore a minimum of operation keys are required. In addition, operation is kept easy because the number of functions executable by each function key is limited.

In addition, according to the above-mentioned second embodiment of the invention which incorporates a card reader, the second AV device 2 can also be controlled if control data for the second AV device 2 (functions A' to E') are read from a memory card 13. The data may be read from a memory card installed in the first AV device 1, or alternatively, the second AV device 2 may have a port for installation of a memory card. The read data may be fed to the programmable RAM 4 of the first AV device, or alternatively, the memory card 13 itself may be utilized as RAM or ROM memory and receive control signals from the ROM memory 3 main processing data of the first AV device 1.

Although the preferred embodiment has been described in terms of the interconnection of two AV devices, three or more AV devices may be interconnected according to the system of the invention. In such case, each function key must be capable of at least as many functions as there are interconnected devices. According to this, a larger number of tables will be implemented in the RAM memory 4, or memory cards or the like may be accessed as additional function tables. For example, video tape recorders, laser disk players, personal computers, game devices, compact disk players and tuners may be utilized as components of an AV system according to the invention.

It will further be noted that image display data may be incorporated in control data.

Accordingly according to the first embodiment of an AV system of the Invention, control data of a second, connected AV device may be read by a first AV device and stored therein, allowing the second AV device to be conveniently operated from function keys of the first AV device. The functions of each of the function keys are therefore varied, or added, corresponding to the number of connected AV devices external to the first AV device.

Further, according to the second embodiment of the invention utilizing a memory card and a memory card reader, functions of external, connected AV devices may be read from a memory card installed in the external device or in the first AV device and stored in the first AV device, allowing the external devices to be controlled by each function key of the first AV device according to the stored control data. Thus the same advantages as those of the aforementioned first embodiment are available.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modifications of the shown embodiments which are within the principle of the invention as set forth in the appended claims.

What is claimed is:

1. An audiovisual system comprising:
a first audiovisual device;
a plurality of function keys arranged in said first audiovisual device, each function key corresponding to respective ones of a plurality of control data;
connection cable means for connecting said first audiovisual device to a second audiovisual device;
transmitting/receiving means for transmitting and/or receiving data between said first audiovisual device and said second audiovisual device over said connection cable means;
first reading means arranged in said first audiovisual device for reading control data from said second audiovisual device;
memory means arranged in said first audiovisual device for storing said control data read from said second audiovisual device; and
second reading means arranged in said first audiovisual device for reading said stored control data from said memory means and transmitting said control data back to said second audiovisual device via said transmitting/receiving means and said connection cable means according to operation of one of said function keys.

2. An audiovisual device as set forth in claim 1 further comprising a communication adapter connected to said transmitting/receiving means.

3. An audiovisual device as set forth in claim 1 wherein control data corresponding to respective function keys of said audiovisual device is varied to correspond to said audiovisual device according to a selection of a mode of said second audiovisual device using at least one of said function keys.

4. An audiovisual device as set forth in claim 1 wherein a plurality of second audiovisual devices are connected thereto, control data of respective function keys of said audiovisual device being variable to correspond to at least as many second audiovisual devices as are connected.

5. An audiovisual device as set forth in claim 1 further including third reading means for reading a memory card, and a memory card containing control data for the second audiovisual device being associated with said third reading means for storing a content of said memory card in said memory means.

* * * * *